3,289,850
ICE SKIMMER
Peter J. Gubash, 76 Fairfield Ave. W., St. Paul, Minn.
Filed Feb. 7, 1964, Ser. No. 343,258
2 Claims. (Cl. 210—470)

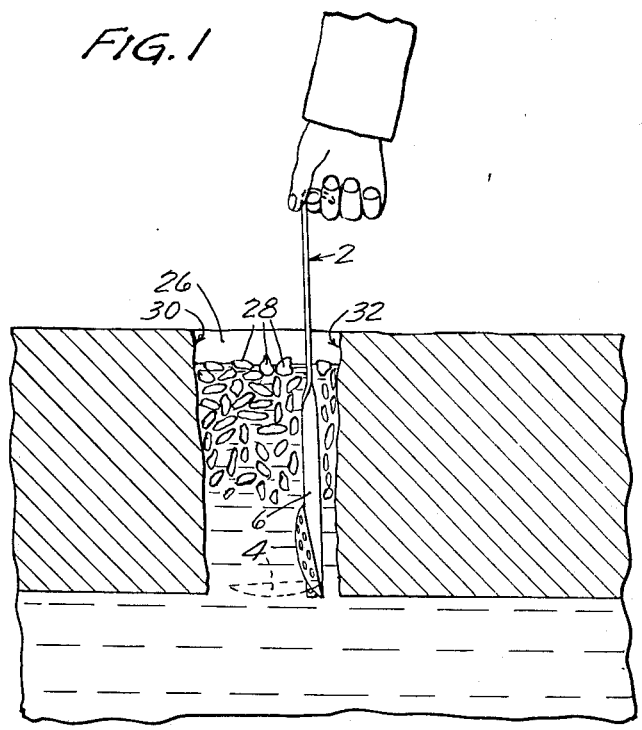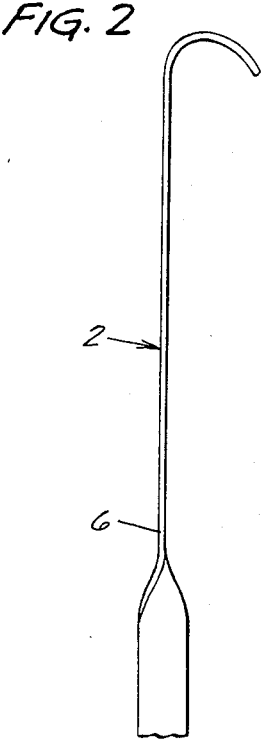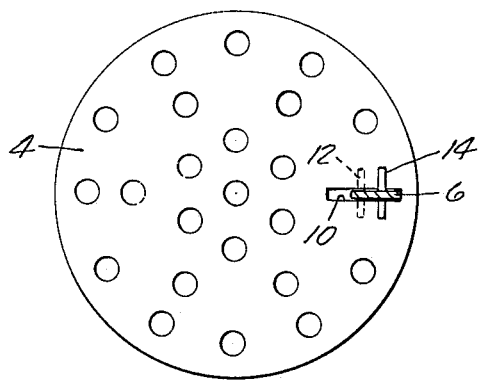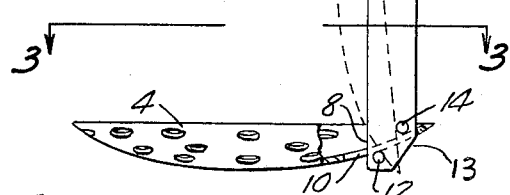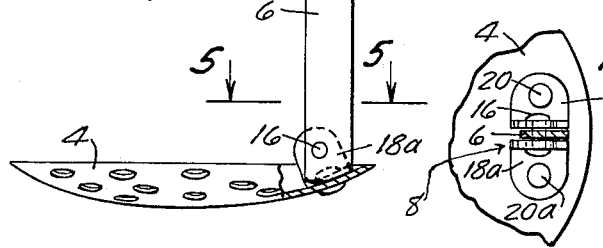

This invention relates to an improved device for removing chipped ice from a fishing hole in frozen lakes or streams by ice fishermen during and after the process of chopping or boring a fishing hole through the ice.

For fishing through the ice (ice fishing) it is common practice to chop a relatively circular hole of about 4–6 inches in diameter through the ice. Ice chisels are commonly used, but both hand and power driven ice augers are now gaining popularity for this operation. During such operations it is frequently necessary to clear the chips of ice from the hole after the depth thereof progresses. A comomn practice is to utilize an "ice skimmer" for removing the ice chips, the usual form of the skimmer being a handle from 18–30 inches long having at one end thereof (and at essentially a right angle to the axis of the handle) a perforated concave disk having a diameter of 3½–6 inches. This use of the prior art ice skimmers is fairly satisfactory with relatively thin ice, i.e. 4–6 inches thick, however when the ice is 18–36 inches thick it becomes increasingly difficult to lower the rigid skimmer into the hole in order to get beneath the ice chips and scoop them out of the way.

The ice skimmer is also used to remove ice chips from the fishing hole when one has completed the operation of cutting through to the water below. Again the prior art ice skimmers are less than satisfactory for this operation because of the tendency of the disk to push some of the ice chips back into the water each time you attempt to remove them from the hole and the operation has to be repeated a number of times before clearing the hole of ice chips.

It is an object of the present invention to provide an ice skimmer which can be easily placed in the bottom of the hole beneath the accumulated ice chips during the boring operation and which greatly facilitates and speeds up their removal from the hole.

A further object of the invention is to provide an ice skimmer which greatly facilitates and speeds up the removal of ice chips from the water in the completed hole and which largely avoids the problem of unwanted downward displacement of ice chips during the clearing operation.

The manner in which the above mentioned and other objectives and advantages are accomplished in accordance with the present invention will be apparent from the following description, taken in conjunction with the accompanying drawing in which:

FIGURE 1 is a side view of my device inserted in an ice hole, the ice and underlying water being shown in vertical section through the ice hole;

FIGURE 2 is a side elevation of a presently preferred form of my device;

FIGURE 3 is a sectional view taken along the lines 3—3 of FIGURE 2;

FIGURE 4 is a side view, partially broken away, showing an alternate embodiment; and FIGURE 5 is a sectional view taken along the lines 5—5 of FIGURE 4.

Referring now to the drawings, wherein like reference characters refer to like parts in several views, my device 2 comprises a concave perforated disk 4 which is attached to an elongate handle member 6 having hinge means 8 whereby the disk is capable of arcuate reciprocal motion between a closed position in which the disk is folded with its concave superior surface against the anterior face of the handle member and in a plane substantially parallel to the axis of the handle member; and to an open position in which the plane defined by the upper edge of the disk is at essentially a right angle to the axis of said handle member. In the presently preferred embodiment as shown in FIGURES 1, 2, and 3 the disk has a radially oriented slot 10 closely adjacent the peripheral edge of the disk and shaped to accommodate the distal portion of the handle member 6. Stop means for limiting the downward arcuate movement of the disk beyond the generally right angular open position are here provided in the form of stop pins 12 and 14 which are generally parallel and spaced apart, the pins extending approximately equidistantly from each side of the handle and transverse thereto. Stop pin 12 is placed in a distal portion of the handle member anterior of the midline thereof and below the inferior surface of the disk, while stop pin 14 is fixed at a position above the superior surface of the disk and at a point posterior to the midline of the handle member. The distance between the stop pins 12 and 14 is selected to form an articulated joint having limited movement, i.e. in the open position the plane of the disk is at approximately a right angle to the axis of the handle member, the anterior pin 12 abutting the inferior surface of the disk while the posterior pin 14 engages the superior surface whereby movement beyond the open position is prevented; and the distance further being selected so that the disk may be freely moved to the closed position illustrated by the dotted lines in FIGURE 2. The free movement of the disk is further enhanced by providing beveled end 13 on the posterior distal portion of the handle member.

In the alternate embodiment illustrated in FIGURES 4 and 5 the disk is not provided with a radial slot, but rather the hinge means 8 is formed by the handle member 6 which has an axle 16 positioned slightly anterior to the midline thereof and pivoted to parallel tabs 18 and 18a which extend perpendicularly from the superior surface of the disk at a position near the peripheral edge, the vertical axis of the tabs being at a slight acute angle to the plane of the disk but parallel to the axis of the handle member.

In the embodiment illustrated in FIGURES 4 and 5 the tabs comprise two short pieces of metal bent at right angles and fixed to the disk by rivets 20 and 20a or other suitable fastening means. The distal end of the handle member 6 has an arcuate surface, the curvature of at least the posterior half of the end conforming generally to that of the corresponding surface of the disk, while the anterior end is more sharply curved or rounded so as to provide clearance when the disk is moved to the closed position.

Referring specifically to FIGURE 1 of the drawings, the ice 22 over the water of a lake 24 is shown with a completed fishing hole 26 cut through the ice. I have found that the ice chips 28 may be removed from the fishing hole in less than half the time and with less than half the effort as was heretofore possible using the ice skimmers of the prior art. A convenient manner for using my device is to move the disk to the closed position shown in FIGURE 1 by pushing the inferior surface of the disk against the edge and side of the hole furthermost from the fisherman (indicated by the arrow 30 in FIGURE 1) and after pushing the device down to a point where the disk is below the floating ice chips, by moving the handle member back towards the proximal edge of the ice hole (shown by the arrow 32 in the drawings) the disk "flops" to the position illustrated by the dotted line whereby a great majority of the ice may be lifted out of the hole on the very first withdrawal of the skimmer, thus greatly speeding up and simplifying this operation.

The handle member and disk are conveniently made of flat iron and galvanized sheet metal respectively, but other materials may be used. Likewise, various hinge means for affixing the disk to the handle may be substituted for the forms specifically illustrated. However, such substitutions or modifications are within the spirit and scope of this invention, and it should be understood that the particular forms illustrated place no limitation thereon except as defined in the appended claims.

What I claim is as follows:

1. An ice skimmer for removing ice chips from holes bored into the ice on frozen-over lakes and streams, said skimmer comprising an elongate handle member and a perforated concave disk, said disk being attached near a peripheral edge thereof to a distal portion of said handle member by hinge means whereby said disk may be moved between a closed position in which the disk is folded against the handle member and an open position in which the plane of the disk is at substantially a right angle to the axis of said handle member, said disk having a radially oriented slot closely adjacent the peripheral edge of the disk and shaped to accommodate the distal portion of said handle member, said handle member extending through said slot and having two stop pins extending approximately equidistantly from each side of said handle and transverse thereto, one of said stop pins being positioned anterior to the midline of said handle member and below the inferior surface of said disk, the other of said stop pins being positioned posterior to the midline of said handle member and above the superior surface of said disk whereby an articulated joint having limited movement is provided.

2. An ice skimmer according to claim 1 in which the posterior distal portion of said handle member is beveled.

References Cited by the Examiner

UNITED STATES PATENTS

| | | | |
|---|---|---|---|
| 452,044 | 5/1891 | Doolittle | 210—470 |
| 2,355,130 | 8/1944 | Yerkes | 210—470 X |

REUBEN FRIEDMAN, *Primary Examiner.*

C. M. DITLOW, *Assistant Examiner.*